(12) United States Patent
Foohey

(10) Patent No.: US 10,342,338 B2
(45) Date of Patent: *Jul. 9, 2019

(54) STOWAGE MODULE MOUNTED TRAY TABLE WITH MULTI-BAR LINKAGE DRIVEN MOVEMENT

(71) Applicant: B/E Aerospace, Inc., Winston-Salem, NC (US)

(72) Inventor: Mark W. Foohey, Austin, TX (US)

(73) Assignee: B/E Aerospce, Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,750

(22) Filed: Mar. 26, 2018

(65) Prior Publication Data

US 2018/0279779 A1 Oct. 4, 2018

Related U.S. Application Data

(60) Provisional application No. 62/478,239, filed on Mar. 29, 2017.

(51) Int. Cl.
| | |
|---|---|
| *A47B 83/02* | (2006.01) |
| *B60N 3/00* | (2006.01) |
| *B64D 11/06* | (2006.01) |
| *A47B 3/00* | (2006.01) |

(52) U.S. Cl.
CPC ............ *A47B 83/02* (2013.01); *B60N 3/002* (2013.01); *B64D 11/0638* (2014.12); *A47B 3/00* (2013.01)

(58) Field of Classification Search
CPC ..... A47B 83/02; A47B 83/0215; A47B 83/00; B64D 11/0638; B60N 3/002
USPC ....... 297/128, 119, 120, 145, 149, 150, 151, 297/160, 161, 162, 173; 108/103, 42; 248/277.1, 278.1
See application file for complete search history.

(56) References Cited

U.S. PATENT DOCUMENTS

| | | | | |
|---|---|---|---|---|
| 478,987 A | * | 7/1892 | Colby ................... | A47B 83/02 297/142 |
| 1,196,050 A | * | 8/1916 | Watkins ................. | A47C 7/70 297/162 |
| 2,473,037 A | * | 6/1949 | Morgan ................. | A47C 7/70 297/162 |
| 2,980,165 A | * | 4/1961 | Stine ...................... | A61G 5/10 108/6 |
| 3,342,148 A | * | 9/1967 | Fritsch ................. | A47B 13/081 108/102 |
| 4,546,708 A | * | 10/1985 | Wilburth ............... | A47B 11/00 108/103 |
| 4,687,167 A | * | 8/1987 | Skalka ................ | A47B 21/0314 108/103 |

(Continued)

*Primary Examiner* — Jose V Chen
(74) *Attorney, Agent, or Firm* — Clements Bernard Walker PLLC

(57) ABSTRACT

A tray table assembly including a tray table movable horizontally along a predetermined path between a stowed position within a stowage module and a deployed position outside of the stowage, a linear translation member adapted to adjust a position of the tray table relative to a passenger seat, and a multi-bar linkage assembly affixed at one end to the tray table and at an opposing end to the linear translation member, the multi-bar linkage assembly comprising a plurality of links arranged to deploy the tray table along the predetermined path between the stowed and deployed positions.

20 Claims, 5 Drawing Sheets

(56) References Cited

U.S. PATENT DOCUMENTS

| | | | | |
|---|---|---|---|---|
| 4,863,124 A | * | 9/1989 | Ball | A47B 21/00 |
| | | | | 108/28 |
| 5,816,649 A | * | 10/1998 | Shields | A47B 13/023 |
| | | | | 297/162 |
| 6,142,559 A | * | 11/2000 | Sorel | A47C 7/70 |
| | | | | 108/48 |
| 7,607,726 B2 | * | 10/2009 | Orlo | B60N 3/004 |
| | | | | 248/421 |
| 7,874,614 B2 | * | 1/2011 | Figueras Mitjans | A47C 7/70 |
| | | | | 297/145 |
| 8,109,566 B2 | * | 2/2012 | Koh | A47C 7/70 |
| | | | | 297/145 |
| 8,596,206 B2 | * | 12/2013 | Legeay | B60N 3/002 |
| | | | | 108/137 |
| 8,979,190 B2 | * | 3/2015 | Madrigal | A47B 83/02 |
| | | | | 297/161 |
| 9,708,066 B2 | * | 7/2017 | Thompson | B60N 3/002 |
| 9,783,303 B2 | * | 10/2017 | Gagnon | B64D 11/06 |
| 9,815,556 B2 | * | 11/2017 | Helwig | B64D 11/0638 |
| 10,023,315 B2 | * | 7/2018 | Kuyper | A47B 5/006 |
| 2013/0093221 A1 | * | 4/2013 | Ligonniere | B64D 11/06 |
| | | | | 297/173 |
| 2014/0021750 A1 | * | 1/2014 | Su | A47C 7/70 |
| | | | | 297/162 |
| 2014/0225402 A1 | * | 8/2014 | Dehli | A47C 7/70 |
| | | | | 297/173 |
| 2015/0284089 A1 | * | 10/2015 | Gow | B64D 11/0605 |
| | | | | 297/147 |
| 2016/0114442 A1 | * | 4/2016 | Possamai | B25J 9/106 |
| | | | | 248/277.1 |
| 2016/0375810 A1 | * | 12/2016 | Kong | B60N 2/793 |
| | | | | 297/145 |
| 2017/0021932 A1 | * | 1/2017 | Marais | B64D 11/0638 |

* cited by examiner

STOWAGE MODULE MOUNTED TRAY TABLE WITH MULTI-BAR LINKAGE DRIVEN MOVEMENT

RELATED APPLICATION AND INCORPORATION BY REFERENCE

This application claims priority from U.S. Application No. 62/478,239 filed Mar. 29, 2017, the entirety of which is incorporated by reference herein.

BACKGROUND

The inventive concepts disclosed herein relate generally to the field of deployable tray tables for use aboard aircraft and other passenger conveyances, and more particularly, to a deployable tray table mounted to a multi-bar deployment mechanism configured to provide arced deployment motion between a stowed position within a stowage module and a deployed position outside of the stowage module, wherein a fore/aft translation stage of the tray table is built into the stowage module to provide a compact vertical profile in the tray table.

Passenger tray tables are known for use aboard aircraft and other conveyances for dining, working, etc. Tray tables are typically stowed as standard safety procedure during taxi, take-off and landing, and can be deployed as needed for use by passengers during flight.

Tray tables serving economy class seats can deploy from against the backside of a forward positioned seat. In the case of the first row of economy class or other seating arrangement lacking a similar forward-positioned seat, tray tables can deploy from against partitions walls or from within armrests positioned alongside the seat.

In the case of seatback and partition mounted tray tables, arms attached to the left and right sides of the tray table guide movement of the tray table between a stowed position in which the tray table is generally vertically-oriented, and a deployed position in which the tray table is generally horizontally-oriented. Fore and aft motion of the tray table can be achieved by allowing the tray table to slide relative to the supporting arms.

In the case of armrest mounted tray tables, which are also commonly used to serve business class and first class seats, these tray tables typically deploy from within or alongside the armrests by way of a complex hinge that allows multi-axis tray table movement. For example, the tray table may stow vertically within the armrest, pivot about a vertical axis to withdraw the tray table from the armrest, then fold or rotate to a horizontal position across the lap of the passenger.

While the above-described tray tables can be used to equip seats arranged into rows of like seats, such configurations are not capable of serving premium class seats such as those arranged into individual passenger suites. Passenger suites can include larger seating and living spaces, and therefore may require tray table deployment from more distant structures within the suite such as modules, dressers, tables, stowage compartments and other furniture. Accordingly, the present invention is directed to tray table deployment configurations suitable for accommodating various premium seating class arrangements.

SUMMARY

In one aspect, embodiments of the inventive concepts disclosed herein are directed to a tray table assembly including a tray table movable horizontally along a predetermined path between a stowed position and a deployed position, a linear translation member adapted to adjust a position of the tray table relative to a passenger seat, and a multi-bar linkage assembly affixed at one end to the tray table and at an opposing end to the linear translation member, the multi-bar linkage assembly including a plurality of links arranged to deploy the tray table along the predetermined path between the stowed and deployed positions.

In another aspect, the multi-bar linkage assembly may include a first link pivotably attached at one end to an extension of the linear translation member, a second link pivotably attached at one end to the linear translation member, a third link pivotably attached at one end to the first link and at an opposing end to the tray table, and a fourth link pivotably attached at one end to the second link and at an opposing end to the tray table, wherein the third link is pivotably attached to the second link.

In a further aspect, the first link may limit angular rotation between the first link and the third link, and the second link may limit angular rotation between the second link and the third link, such that the first link and the second link cooperate to limit rotation of the third link to limit tray table deployment.

In a further aspect, at least one of link length, link configuration, and pivoting attachment points between links may determine the predetermined path.

In a further aspect, the linear translation member may operate independently of the multi-bar linkage assembly.

In a further aspect, the predetermined path may be an arced path such that the tray table rotates 90-degress as the tray table transitions between the stowed and deployed positions of the tray table.

In a further aspect, the linear translation member may be adapted to horizontally translate along a fixed guide member.

In a further aspect, the multi-bar linkage assembly may fold to stow below and within the bounds of a surface area of the tray table when the tray table is in the stowed position.

In a further aspect, a combined vertical profile of the tray table and the multi-bar linkage assembly may be between 1" and 2".

In another aspect, embodiments of the inventive concepts disclosed herein are directed to a tray table assembly including a stowage module adapted to be positioned in proximity to a passenger seat, a tray table configured to transition along a predetermined path between a stowed position within the stowage module and a deployed position outside of the stowage module, a linear translation member coupled for movement relative to the stowage module, and a multi-bar linkage assembly affixed at one end to the tray table and at an opposing end to the linear translation member, the multi-bar linkage assembly including a plurality of links arranged to deploy the tray table along the predetermined path between the stowed and deployed positions.

In another aspect, the multi-bar linkage assembly may include a first link pivotably attached at one end to an extension of the linear translation member, a second link pivotably attached at one end to the linear translation member, a third link pivotably attached at one end to the first link and at an opposing end to the tray table, and a fourth link pivotably attached at one end to the second link and at an opposing end to the tray table, wherein the third link is pivotably attached to the second link.

In a further aspect, the first link may limit angular rotation between the first link and the third link, and the second link may limit angular rotation between the second link and the third link, such that the first link and the second link cooperate to limit rotation of the third link to limit tray table deployment.

In a further aspect, the linear translation member may translate horizontally along a fixed member mounted to the stowage module to adjust a distance of the tray table from a passenger seat, and wherein the linear translation member operates independent of the multi-bar linkage assembly.

In a further aspect, the predetermined path may be an arced path such that the tray table rotates 90-degress as the tray table transitions between the stowed and deployed positions of the tray table.

In a further aspect, a longitudinal tray table axis may be parallel to a longitudinal stowage module axis when the tray table is in the stowed position, and wherein the longitudinal tray table axis my be at an angle to the longitudinal stowage module axis when the tray table is in the deployed position.

In a further aspect, the assembly may include a tray disposed in the stowage module, wherein the tray table is housed within the tray and the multi-bar linkage assembly folds to stow below the tray table when the tray table is in the stowed position.

In a further aspect, the tray may include a perimeter sidewall with a break in the perimeter sidewall at an exit point of the tray table from the tray and the stowage module.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Embodiments of tray table assemblies and linkage arrangements for controlling tray table deployment along an arced path are disclosed herein. Such embodiments are particularly well suited for conveyance applications where seatback and/or armrest tray table mounting is not possible and therefore requires an alternative mounting solution. Such embodiments are particularly advantageous in that the linkage arrangements disclosed herein can be modified in link number, link length and/or joint attachment points to achieve a variety of predetermined deployment paths for the table to accommodate any angular relationship between the longitudinal seat axis and the structure from which the tray table deploys, as well as any distance between the seat and structure.

The tray table embodiments disclosed herein are further advantageous in that the fore/aft translation component of the tray table assembly is mounted apart from the tray table itself, thereby avoiding component stacking and allowing the tray table to achieve a thin vertical profile. As a further advantage, the tray table can be slid forward apart from the respective passenger seat, thereby allowing seat egress without having to stow the tray table and items thereon.

Figure 1:
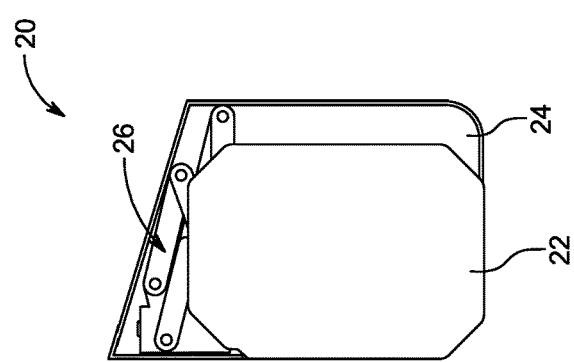
FIG. 1 is a top plan view of a tray table assembly shown fully stowed within a portion of a stowage module.

FIG. 1 shows a tray table assembly 20 generally including a tray table 22, a stowage module 24, and a multi-bar linkage assembly 26 coupling the tray table 22 to the stowage module 24. The tray table 22 is a generally flat, planar table that can have rounded corners as shown. The tray table can be made from durable lightweight plastics or like materials commonly used aboard aircraft, and can have conventional features such as a raised perimeter lip to maintain items on the tabletop and/or a recessed cup holder.

The term "stowage module" as used herein generically refers to any structure positioned in proximity to a passenger seat served by the tray table assembly 20, and within or upon which the tray table 22 stows within and deploys apart therefrom. Suitable examples of stowage modules include, but are not limited to, armrests, consoles, tables, cabinets, dressers, partitions and monuments. In a particular embodiment, the stowage module 24 is an armrest adapted to be positioned alongside a passenger seat such that longitudinal seat axis and longitudinal armrest axis are parallel, and wherein the longitudinal tray table axis is parallel to each of the longitudinal seat axis and the longitudinal armrest axis when the tray table is fully stowed, and wherein the longitudinal tray table axis is perpendicular to each of the longitudinal seat axis and the longitudinal armrest axis when the tray table is fully deployed.

In this arrangement, the tray table 22 is configured to fully stow within the bounds of the armrest and deploy to a position outside of the armrest, for example, to deploy to a position directly forward of the passenger seat. The end of the linkage assembly 26 affixed to the stowage module 24 is housed within the stowage module 24, thereby locating pinch points and the fore/aft translation mechanism out of reach of the seated passenger. The opposing end of the linkage assembly is affixed to the underside of the tray table 22. An intermediate portion of linkage assembly 26 is visible when the tray table 22 is deployed. Pinch points of the linkage assembly 26 can be covered to protect the seated passenger.

In alternative configurations, the stowage module can be located in other locations in proximity to the passenger seat, for example, directly forward or at an angle to the passenger seat. The tray table deployment path and path length can be customized based on the linkage arrangement, number of links, link length, pivot stops, etc.

In a particular embodiment, the stowage module 24 includes a horizontal cavity that opens through a side of the stowage module and from which the tray table 22 deploys. The cavity opening may be located below a top of the stowage module 24 that serves as an armrest and/or working surface. When fully stowed, the tray table 22 is entirely disposed within the cavity such that the tray table is housed within the bounds of the stowage module 24. A latch, handle or mechanical or electrically-actuated assist can be used to deploy the tray table 22 from the cavity. The assembly can further include a latch or lock to prevent unintentional tray table deployment.

Figure 3:
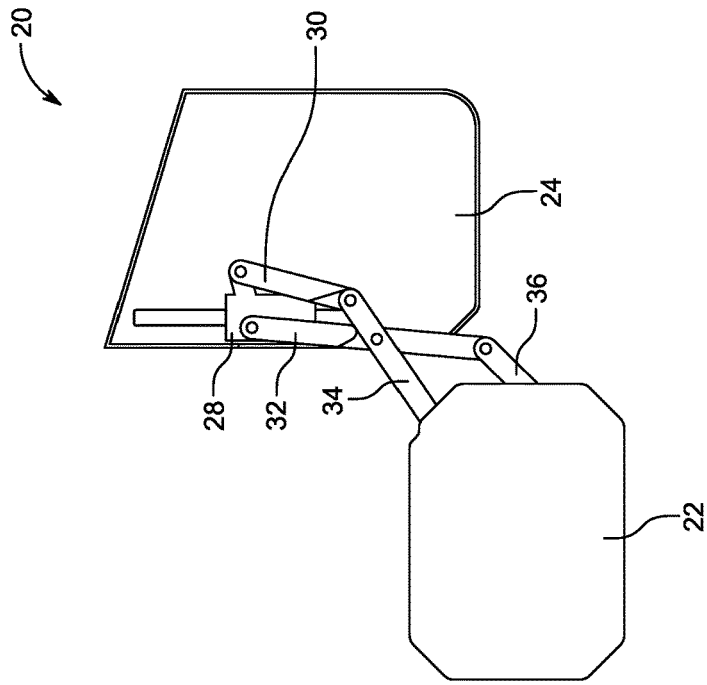
FIG. 3 is a top plan view of the tray table assembly showing the tray table fully deployed.
Figure 2:
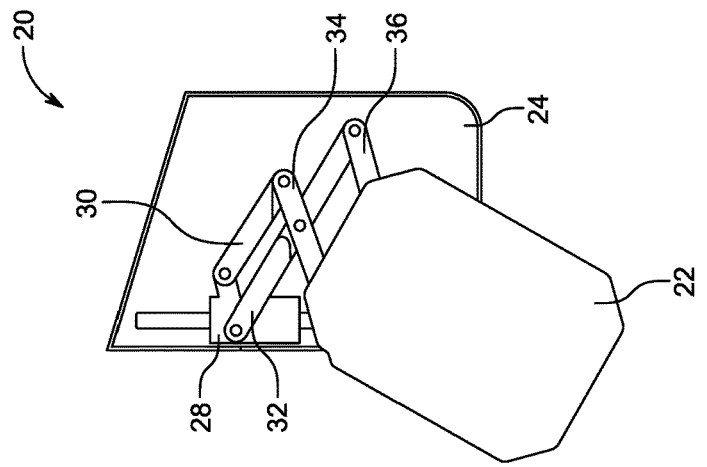
FIG. 2 is a top plan view of the tray table assembly showing the tray table partially deployed.

FIG. 2 shows the tray table 22 partially deployed from the stowage module 24. FIG. 3 shows the tray table 22 fully deployed from the stowage module 24. As the tray table 22 moves from the fully stowed position thereof as shown in FIG. 1 to the partially deployed position thereof as shown in FIG. 2, and from the partially deployed position as shown in FIG. 2 to the fully deployed position as shown in FIG. 3, it can be seen comparing the figures and following the change in table orientation that deployment follows an arced path. Specifically, the tray table 22 is guided along an arced path such that the tray table 22 rotates 90 degrees between the fully stowed and fully deployed positions. This 90-degree rotation is particularly suited for applications in which the longitudinal seat axis and longitudinal stowage module axis, or at least the longitudinal axis of the cavity, are parallel. The arced deployment path and 90-degree rotation of the tray table 22 positions the longitudinal tray table axis perpendicular to the longitudinal seat axis when the tray table 22 is fully deployed, as shown in FIG. 3.

Arced motion is achieved and controlled by the multi-bar linkage assembly 26, which generally includes a first link 30 pivotably attached at one end to an extension of the fore and aft translation member 28, a second link 32 pivotably attached at one end to the fore and aft translation member 28, a third link 34 pivotably attached at one end to the first link 30 and at an opposing end to the tray table 22, and a fourth link 36 pivotably attached at one end to the second link 32 and at an opposing end to the tray table 22. The third link 34 is further pivotably attached about mid-span to the second link 32. In this configuration, the arrangement is a multi-bar (e.g. six-bar) linkage arrangement having seven joints considering each of the links 30, 32, 34, 36, the tray table 22, and the fore and aft translation member 28.

The first link 30 can be configured to limit angular rotation between the first link 30 and the third link 34, while the second link 32 can be configured to limit angular rotation between the second link 32 and the third link 34. Thus, the first link 30 and the second link 32 can cooperate to limit rotation of the third link 34 to limit tray table 22 deployment. One or more of link length, link configuration, and pivot attachment points thereof can be used to customize and control the degree and path of tray table deployment.

Figure 5:
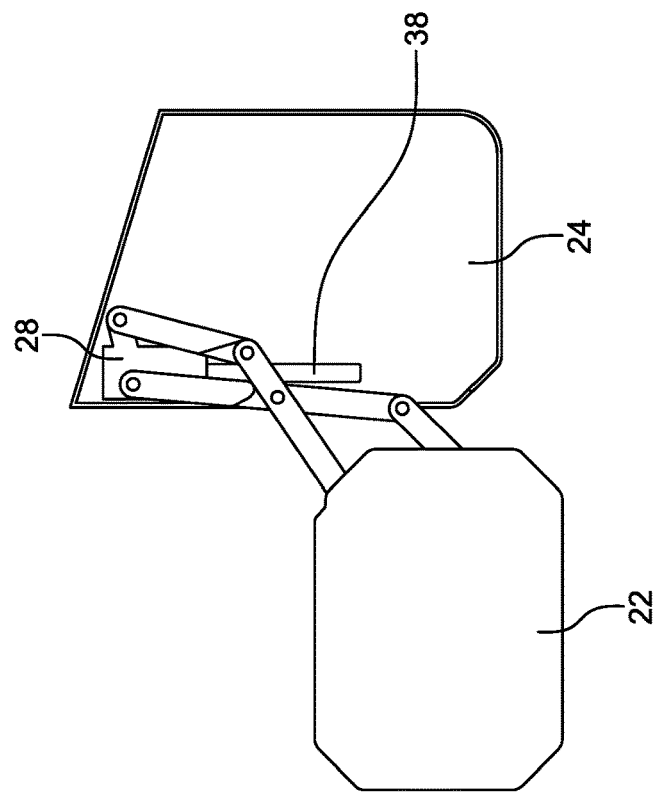
FIG. 5 is a top plan view of the tray table assembly showing the tray table fully deployed and fully translated in the first direction.
Figure 4:
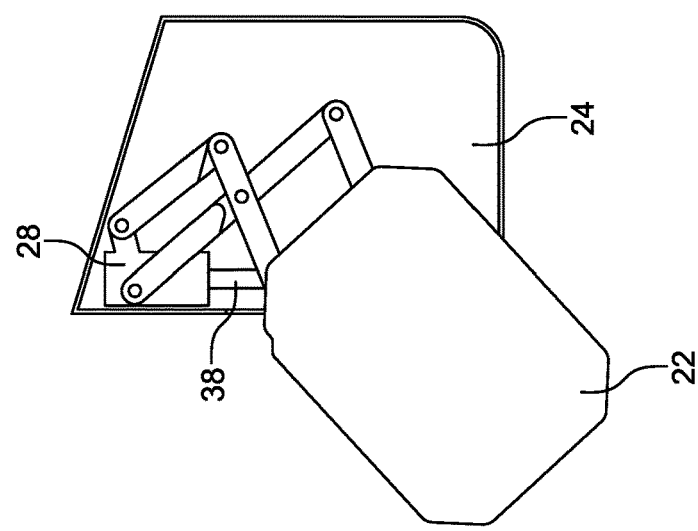
FIG. 4 is a top plan view of the tray table assembly showing the tray table partially deployed and fully translated in a first direction.
Figure 6:
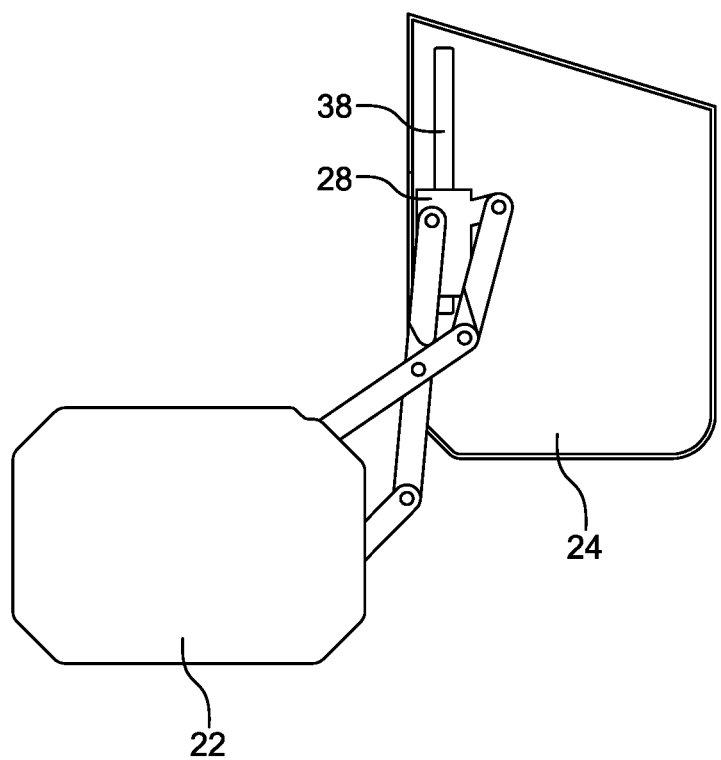
FIG. 6 is a top plan view of the tray table assembly showing the tray table fully deployed and fully translated in a second direction.

FIGS. 4-6 show fore and aft translation movement of the tray table 22 relative to the stowage module 24. The fore and aft translation member 28 is guided along a linear rail or rod 38 that can be a part of or mounted to the stowage module 24. Linear motion of the fore and aft translation member 28 along the guide rail is independent of tray table deployment motion. The length of the rail 38 is determinative of the length of linear travel of the tray table 22 forward and aft. Referring to FIGS. 4 and 5, the fore and aft translation member 28 can be moved to a first position to position the tray table, for example, nearest the passenger seat regardless of the deployment extent of the tray table 22. Referring to FIG. 6, the fore and aft translation member 28 can be moved to a second position to position the tray table, for example, farthest from the passenger seat. As used herein, the terms "fore" and "aft" refer to the tray table positions farthest from and closest to the passenger seat, respectively, and these positions are determined by the orientation of the stowage module 24 relative to the passenger seat, deployment path of the tray table, and orientation of the tray table relative to the linkage assembly 26.

The ability to adjust the fore/aft positioning of the tray table relative to the seat allows the seated passenger to adjust the position of the tray table for comfort and to facilitate seat egress and ingress, among other purposes. Seat ingress/egress can further be facilitated by moving the tray table farthest from the passenger seat and partially stowing the tray table, thus obviating having to fully stow the tray table.

Figure 7:
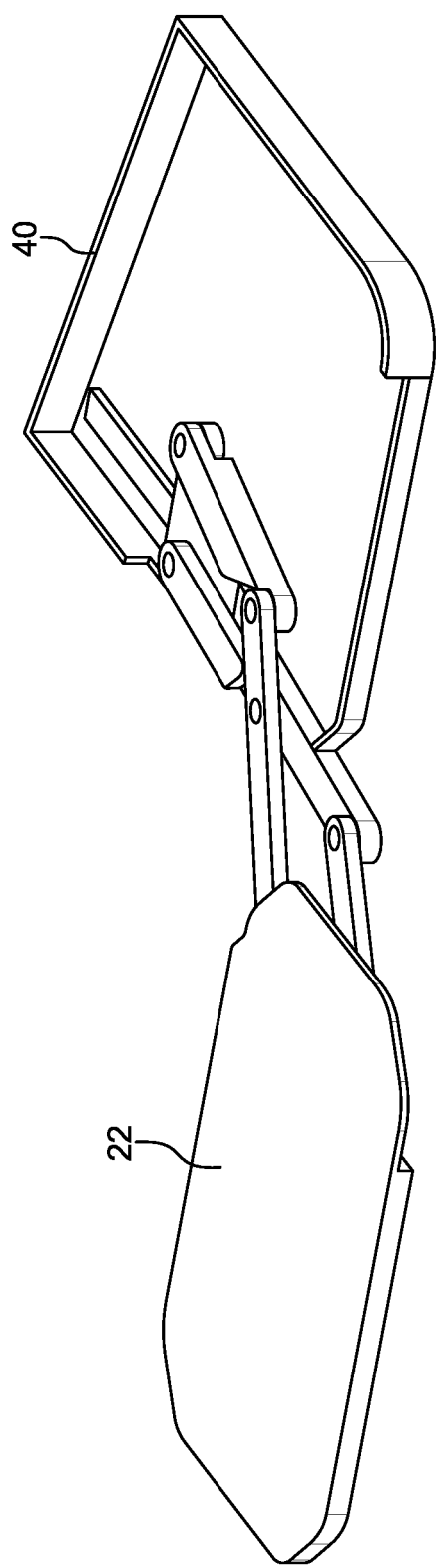
FIG. 7 is a top plan view of the tray table assembly showing the tray table fully deployed.
Figure 8:
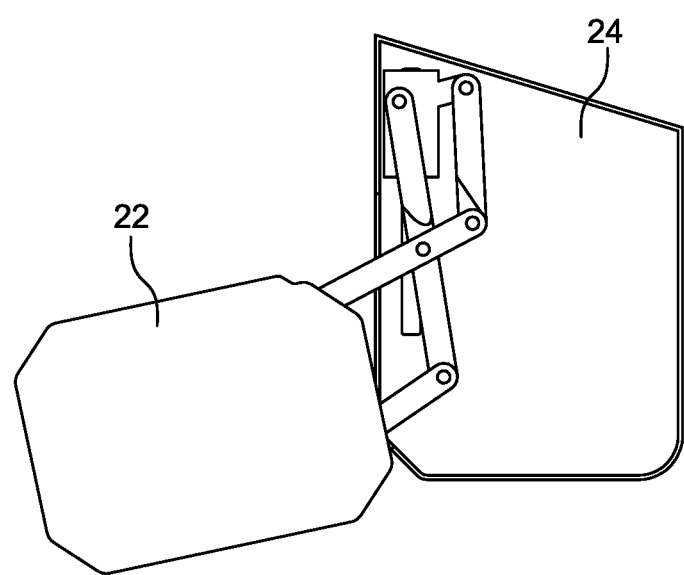
FIG. 8 is a top plan view of the tray table assembly showing linkage pinch points.

FIGS. 7 and 8 show an embodiment of a stowage tray 40 configured to house the tray table 22 within the stowage module when the tray table is fully stowed. The tray 40 includes a perimeter sidewall having a break in the sidewall continuous along the entry/exit point of the tray table 22 and the multi-bar linkage assembly 26. Pinch points at the link intersections can be covered with a plurality of overlapping covers and/or resiliently stretchable covers to conceal the pinch points. The fore and aft translation member 28 is positioned apart from the deployment mechanism, for example within the stowage module, to avoid vertical stacking within the tray table itself. In this arrangement, the point of attachment of the tray table and the linkage assembly can have a thin vertical profile, and the point of attachment of the linkage assembly and the translation member can have a think vertical profile, thus providing an overall think vertical profile of the assembly allowing the assembly to achieve a 1" to 2" overall vertical profile.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A tray table assembly, comprising:
   a tray table movable horizontally along a predetermined path between a stowed position and a deployed position;
   a linear translation member adapted to adjust a position of the tray table relative to a passenger seat; and
   a multi-bar linkage assembly affixed at one end to the tray table and at an opposing end to the linear translation member, the multi-bar linkage assembly comprising a plurality of links arranged to deploy the tray table along the predetermined path between the stowed and deployed positions;
   wherein the predetermined path is an arced path and the tray table rotates as the tray table transitions between the stowed and deployed positions of the tray table.

2. The tray table assembly of claim 1, wherein the multi-bar linkage assembly comprises:
   a first link pivotably attached at one end to an extension of the linear translation member;
   a second link pivotably attached at one end to the linear translation member;
   a third link pivotably attached at one end to the first link and at an opposing end to the tray table; and
   a fourth link pivotably attached at one end to the second link and at an opposing end to the tray table;

wherein the third link is pivotably attached to the second link.

3. The tray table assembly of claim 2, wherein the first link limits angular rotation between the first link and the third link, and the second link limits angular rotation between the second link and the third link, such that the first link and the second link cooperate to limit rotation of the third link to limit tray table deployment.

4. The tray table assembly of claim 2, wherein at least one of link length, link configuration, and pivoting attachment points between links determine the predetermined path.

5. The tray table assembly of claim 1, wherein the linear translation member operates independent of the multi-bar linkage assembly.

6. The tray table assembly of claim 1, wherein the predetermined path is an arced path such that the tray table rotates 90-degress as the tray table transitions between the stowed and deployed positions of the tray table.

7. The tray table assembly of claim 1, wherein the linear translation member is adapted to horizontally translate along a fixed guide member.

8. The tray table assembly of claim 1, wherein the multi-bar linkage assembly folds to stow below and within the bounds of a surface area of the tray table when the tray table is in the stowed position.

9. The tray table assembly of claim 1, wherein a combined vertical profile of the tray table and the multi-bar linkage assembly is between 1" and 2".

10. A tray table assembly, comprising:
a stowage module adapted to be positioned in proximity to a passenger seat;
a tray table configured to transition along a predetermined path between a stowed position within the stowage module and a deployed position outside of the stowage module;
a linear translation member coupled to the stowage module for movement relative to the stowage module; and
a multi-bar linkage assembly affixed at one end to the tray table and at an opposing end to the linear translation member, the multi-bar linkage assembly comprising a plurality of links arranged to deploy the tray table along the predetermined path between the stowed and deployed positions;
wherein the predetermined path is an arced path and the tray table rotates as the tray table transitions between the stowed and deployed positions of the tray table.

11. The tray table assembly of claim 10, wherein the multi-bar linkage assembly comprises:
a first link pivotably attached at one end to an extension of the linear translation member;
a second link pivotably attached at one end to the linear translation member;
a third link pivotably attached at one end to the first link and at an opposing end to the tray table; and
a fourth link pivotably attached at one end to the second link and at an opposing end to the tray table;
wherein the third link is pivotably attached to the second link.

12. The tray table assembly of claim 11, wherein the first link limits angular rotation between the first link and the third link, and the second link limits angular rotation between the second link and the third link, such that the first link and the second link cooperate to limit rotation of the third link to limit tray table deployment.

13. The tray table assembly of claim 10, wherein the linear translation member translates horizontally along a fixed member mounted to the stowage module to adjust a distance of the tray table from a passenger seat, and wherein the linear translation member operates independent of the multi-bar linkage assembly.

14. The tray table assembly of claim 10, wherein the predetermined path is an arced path such that the tray table rotates 90-degress as the tray table transitions between the stowed and deployed positions of the tray table.

15. The tray table assembly of claim 10, wherein a longitudinal tray table axis is parallel to a longitudinal stowage module axis when the tray table is in the stowed position, and wherein the longitudinal tray table axis is at an angle to the longitudinal stowage module axis when the tray table is in the deployed position.

16. The tray table assembly of claim 15, wherein the angle is 90 degrees.

17. The tray table assembly of claim 10, further comprising a tray disposed in the stowage module, wherein the tray table is housed within the tray and the multi-bar linkage assembly folds to stow below the tray table when the tray table is in the stowed position.

18. The tray table assembly of claim 17, wherein the tray comprises a perimeter sidewall having a break in the perimeter sidewall at an exit point of the tray table from the tray and the stowage module.

19. The tray table assembly of claim 10, wherein a combined vertical profile of the tray table and the multi-bar linkage assembly is between 1" and 2".

20. A tray table assembly, comprising:
a tray table movable horizontally along a predetermined path between a stowed position and a deployed position;
a linear translation member adapted to adjust a position of the tray table relative to a passenger seat; and
a multi-bar linkage assembly affixed at one end to the tray table and at an opposing end to the linear translation member, the multi-bar linkage assembly comprising a plurality of links arranged to deploy the tray table along the predetermined path between the stowed and deployed positions, the multi-bar linkage assembly comprising:
a first link pivotably attached at one end to an extension of the linear translation member;
a second link pivotably attached at one end to the linear translation member;
a third link pivotably attached at one end to the first link and at an opposing end to the tray table; and
a fourth link pivotably attached at one end to the second link and at an opposing end to the tray table;
wherein the third link is pivotably attached to the second link.

* * * * *